United States Patent
Ryan et al.

(10) Patent No.: US 6,744,858 B1
(45) Date of Patent: Jun. 1, 2004

(54) SYSTEM AND METHOD FOR SUPPORTING MULTIPLE CALL CENTERS

(75) Inventors: Terry S. Ryan, Grant, AL (US); Randel W. Henry, Huntsville, AL (US)

(73) Assignee: TelControl, Inc., Huntsville, AL (US)

( * ) Notice: Subject to any disclaimer, the term of this patent is extended or adjusted under 35 U.S.C. 154(b) by 135 days.

(21) Appl. No.: 10/056,411

(22) Filed: Jan. 25, 2002

Related U.S. Application Data

(60) Provisional application No. 60/264,242, filed on Jan. 26, 2001.

(51) Int. Cl.[7] .............................................. H04M 11/04
(52) U.S. Cl. ........................ 379/45; 379/49; 379/265.09
(58) Field of Search ........................ 379/37–51, 265.01, 379/265.02, 265.05, 265.09

(56) References Cited

U.S. PATENT DOCUMENTS

| | | | |
|---|---|---|---|
| 4,893,325 A | * | 1/1990 | Pankonen et al. ............. 379/45 |
| 5,841,848 A | | 11/1998 | Dunn |
| 5,844,974 A | | 12/1998 | Ichikawa |
| 5,862,485 A | | 1/1999 | Linneweh, Jr. et al. |
| 5,898,757 A | | 4/1999 | Buhler et al. |
| 5,937,355 A | | 8/1999 | Joong et al. |
| 6,128,481 A | | 10/2000 | Houde et al. |
| 6,233,445 B1 | | 5/2001 | Boltz et al. |
| 6,256,489 B1 | | 7/2001 | Lichter et al. |
| 6,289,083 B1 | | 9/2001 | Ray |
| 6,292,542 B1 | | 9/2001 | Bilder |
| 6,327,342 B1 | | 12/2001 | Mobley et al. |
| 6,330,324 B1 | | 12/2001 | Sabinson et al. |
| 6,332,022 B1 | | 12/2001 | Martinez |
| 6,453,038 B1 | * | 9/2002 | McFarlane et al. .... 379/265.05 |

* cited by examiner

*Primary Examiner*—Wing Fu Chan
(74) *Attorney, Agent, or Firm*—Lanier Ford Shaver & Payne, PC; Anita S. Damian

(57) ABSTRACT

A system and method for routing calls from multiple call centers using remote terminals for receiving incoming calls, a wide area network interfaced with the remote terminals, and a central data manager configured to receive the incoming calls from a communication network and to route them to the remote terminals over the wide area network. The remote terminals enable operators to receive incoming calls and to dispatch personnel in response to the incoming calls. Each of the incoming calls is associated with an automatic number identification identifying a communication device from which the incoming call originated. Additionally, each of the incoming calls is routed over the wide area network to a particular remote terminal based on the associated automatic number identification of the incoming call.

5 Claims, 4 Drawing Sheets

SYSTEM AND METHOD FOR SUPPORTING MULTIPLE CALL CENTERS

CROSS REFERENCE TO RELATED APPLICATION

This document claims priority to and the benefit of the filing date of copending provisional application entitled, "SYSTEM AND METHOD FOR PROVIDING SUPPORT TO MULTIPLE CALL CENTERS VIA VOICE AND DATA OVER INTERNET PROTOCOL," assigned Serial No. 60/264,242, and filed Jan. 26, 2001, which is hereby incorporated by reference.

TECHNICAL FIELD OF THE INVENTION

The invention relates generally to a system that provides, manages, and delivers an open, robust and scaleable platform that is able to support multiple call centers.

BACKGROUND OF THE INVENTION

Transmission control protocol (TCP) and internet protocol (IP), together TCP/IP, have become the most widely used network protocols in the computer industry. TCP/IP provides error-free delivery of data and is compatible with most computers and operating systems. In addition to transmitting data packets over TCP/IP, voice over internet protocol (VoIP), also known as internet telephony, or making a telephone call over the internet, is becoming more popular. Its popularity stems from its relatively low cost and ease of installation and maintenance. Business organizations are using VoIP more to answer calls, take requests from customers, and apply target services to customers. VoIP offers the opportunity not only to route a call to a particular call center, but it also provides the caller's location information to the call taker. A call center is simply a specific unit of a business organization to which the call is forwarded; call centers may be arranged by geographical location. The particular call center takes the call and provides services to the caller or dispatches a service provider to the caller's location or location specified by the caller.

An organization, such as a provider of an emergency 911 services, really benefits from having calls forwarded as quickly as possible to the appropriate Public Safety Answering Point (PSAP) call center. In addition, providing that call center with the caller's location information provides usually critical information faster and often more reliably than requesting it from a caller.

The caller's location is often determined by Automatic Location Information (ALI). ALI information includes the name, address, and other pertinent information (e.g., agencies that serve that address, such as police, fire department, ambulance) about the calling party. Automatic number identification (ANI) is the telephone number of the calling party. The system that takes the ANI at the call center and interfaces to the ALI database and other external interfaces is often referred to as an ANI/ALI controller. Previous custom has been to have an ANI/ALI controller for each call center.

Although present techniques are capable of providing organizations with information, such as ALI and ANI, about a calling party, improved techniques for providing such information quicker and at a reduced cost are generally desirable.

DETAILED DESCRIPTION OF THE INVENTION

Figure 1:
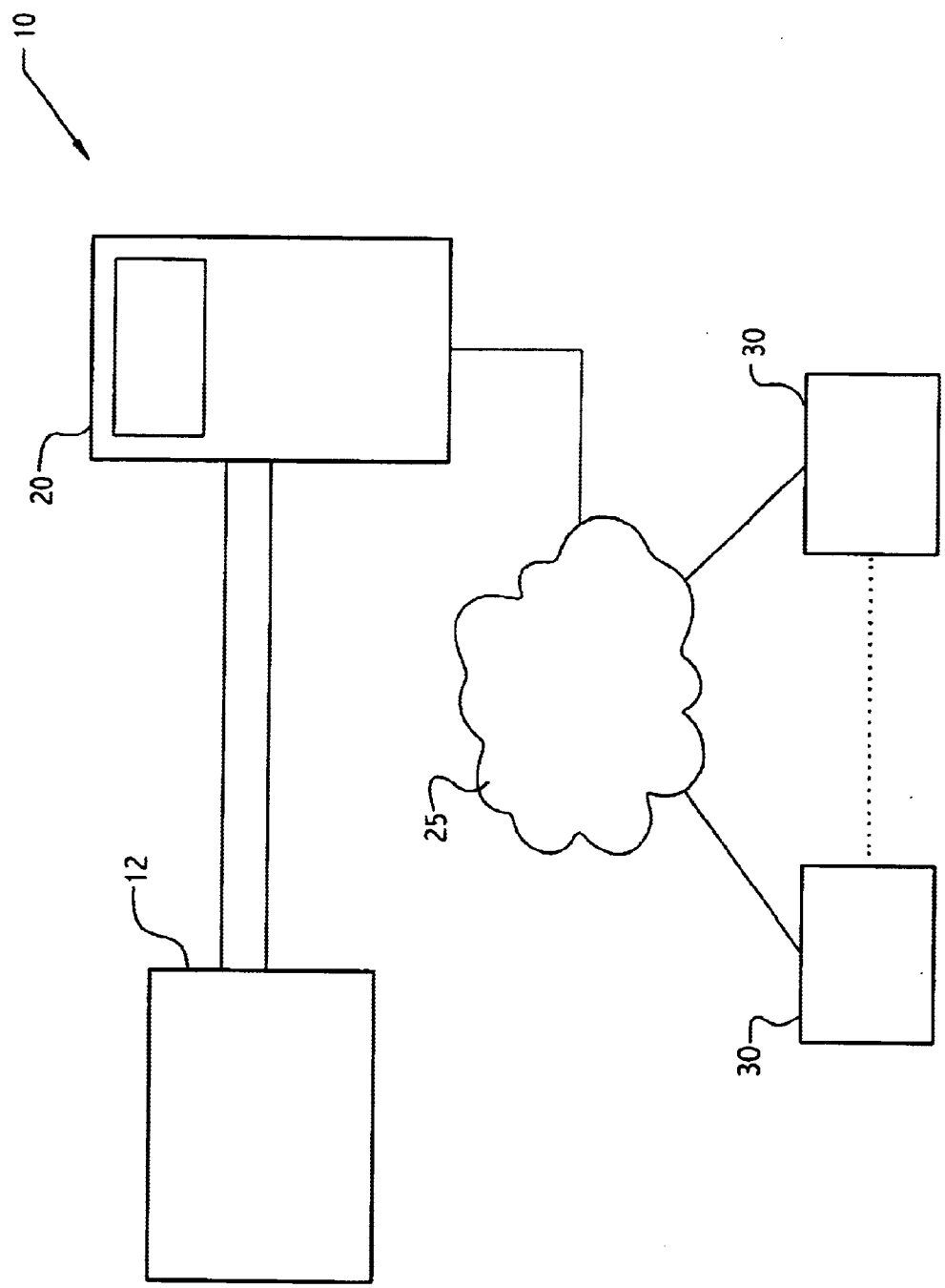
FIG. 1 depicts a service providing system in accordance with a preferred embodiment of the present invention.

A method and system for providing, managing, and delivering a platform that is able to support multiple call centers is described. FIG. 1 depicts an exemplary service providing system 10, such as an emergency service providing system, in accordance with a preferred embodiment of the present invention. The system 10 is preferably comprised of a communication network 12 (e.g., the Public Switch Telephone Network or PSTN), a secure facility 20, a wide area communication network 25 (e.g., TCP/IP network), and call centers 30. The communication network 12 receives calls destined for one of the call centers 30. In this regard, each call destined for one of the call centers 30 is preferably associated with a particular call identifier or a call identifier of a particular set of identifiers. A call identifier associated with an incoming call may be an identifier dialed or otherwise input by the caller. For example, the call centers 30 may be locations for receiving emergency calls and dispatching emergency service personnel in response to the calls. Such emergency call centers in the prior art are typically identified by a "911" call identifier that informs communication networks to route the calls to such a call center.

Moreover, when the communication network 12 receives a call having a particular call identifier, such as the "911" identifier, and originating from a calling device located in a particular geographic area, the communication network 12 is preferably configured to route the call to the secure facility 20. In this regard, the secure facility 20 and, hence, the call centers 30 of FIG. 1 are preferably utilized for servicing calls only from a particular geographic area or a particular set of geographic areas. Other similar facilities 20 and call centers 30 may be employed to service calls from other geographic areas. Moreover, the network 12 is preferably designed to route calls to the secure facility 20 only if the call originated from an area serviced by the facility 20 and call centers 30.

To determine whether a call originated from the particular geographic area serviced by the facility 20 and call centers 30, the network 12 may analyze the automatic number information (ANI) and/or automatic location information (ALI) associated with the call. In this regard, well known techniques exist for analyzing the ANI and ALI of an incoming call to identify the call as originating from a particular calling device or a particular calling area. Such techniques may be employed by the network 12 to determine whether an incoming call originated from a calling device within an area serviced by the facility 20 and call centers 30. Moreover, if an incoming call originated from such an area and if the incoming call is associated with the particular call identifier referred to above, then the network 12 preferably routes the call to the secure facility 20.

When a call is routed to the secure facility 20, a central data manager 32, which may be implemented in software, hardware, or a combination thereof, processes the call according to techniques that will be described in more detail hereafter and routes the call, over the wide area network 25, to one of the call centers 30 depending on the ANI and/or ALI associated with the call. In processing the call, the central data manager 32 may convert the call from one communication protocol to another communication protocol, such as voice over internet protocol (VoIP), for example, in order to increase the performance and/or efficiency of the system 10. The central data manager 32 may also gather information to help the call centers 30 in processing the call. There are various techniques that may be employed by the central data manager 32 to enhance the performance and/or efficiency of the system 10, and examples of such techniques will be described in more detail hereafter.

Various benefits may be realized by utilizing a central facility 20 to intercept or otherwise receive a call from the network 12 and to then route the call to one of the call centers 30 via WAN 25. For example, serving multiple call centers 30 with a central data manager 32, may help to reduce total equipment costs. In this regard, it is not generally necessary to duplicate the processing performed by the central data manager 32 at each of the call centers 30. Thus, equipment at each of the call centers 30 may be reduced. As more call centers 30 are added, the equipment savings enabled by implementing equipment at the central data manager 32 instead of the call centers 30 generally increases.

Furthermore, the system 10 is not dependent on any telephone company's switch for controlling the manner in which data is communicated to the call centers 30. In this regard, the central data manager 32 may receive a call from the network 12 and communicate the call to the destination call centers 30 via any desirable communication technique, such as VoIP, for example. Note that enabling VoIP allows voice and data to efficiently travel together over the WAN 25, which is particularly beneficial for emergency service providers.

Data security is another possible benefit of the exemplary system 10 as the central data manager 32 is able to store the data for different network providers associated with network 12 on different partitions. In this regard, the operator of the facility 20 may secure the data utilized by the facility 20 such that a network service provider of the network 12 is unable to access information provided to the secure facility operator by other network service providers. Thus, the network service providers may be more willing to provide the secure facility operator with its information.

Figure 2:
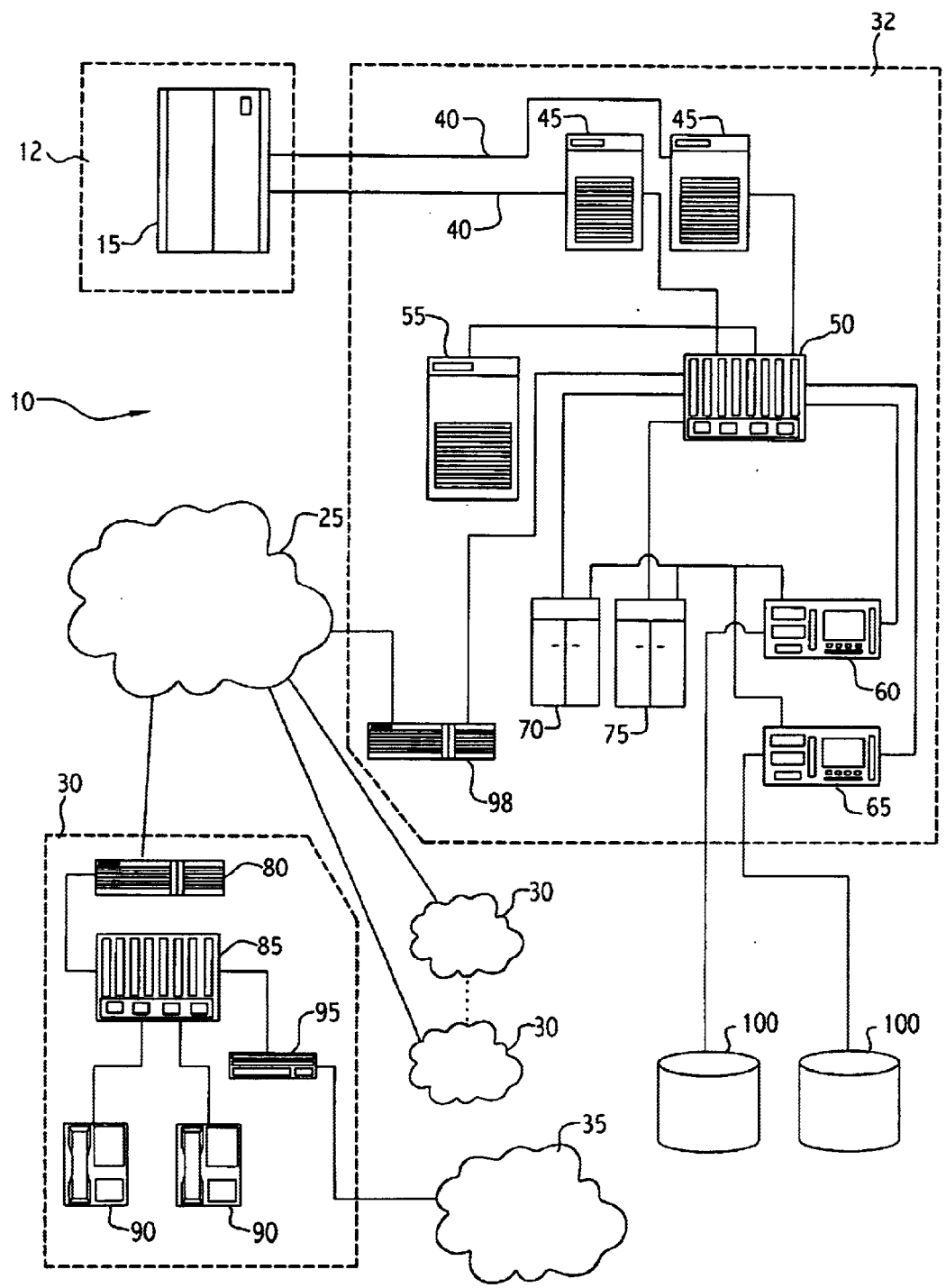
FIG. 2 depicts a more detailed view of the system depicted in FIG. 1.

FIG. 2 is a more detailed view of an exemplary embodiment of the system 10. Other embodiments of the system 10 are possible. The central data manager 32 is comprised of primary and secondary T1 connections 40, voice over IP (VoIP) gateways 45, a Local Area Network (LAN) hub or switch 50, a call manager (soft switch or gatekeeper) 55, a primary server 60 with a local database, a backup server 65 with a local database, and, optionally, a computer-aided dispatch server 70 and a mapping server 75. The call center 30 is comprised of a router 80, LAN hub or switch 85, virtual phone positions or VoIP telephone sets 90, and a local dial tone (DT) switch 95. The term "call center" is used to refer to the organizational unit of a business/office that receives incoming calls as well as, typically, requests for services.

The DMS 100 Tandem office 15 that is depicted in FIG. 2 is only representative; it could be any 911 Tandem office or local telephone switch or exchange from which the call originates. The Tandem office 15 is a switch or a group of existing switches that is used for the communication network 12 to determine to which call center 30 calls should be routed. For example, when a person dials 911, he will preferably have dedicated circuits, i.e., 911 trunks, going into a 911 Tandem office. The 911 Tandem office has the responsibility of taking the automatic number identification (ANI) and automatic location information (ALI) from the calling number and determining which Public Safety Answering Point (PSAP) call center that call should be routed to by performing a lookup in the Tandem's database tables and then getting the call switched to that PSAP call center over a dedicated trunk. In the 911 example, the Tandem's database preferably knows not only which PSAP call center serves it, but also which fire department, police department, EMS office, etc., serves that subscriber number. The Tandem 15 contains the database tables that enable it to perform selective routing based on the calling number or ANI. The Tandem 15 passes the information in its database tables on to the central data manager 32 along with the call so that the central data manager 32 knows which call center 30 to transfer the call to. There are multiple dedicated trunks to each call center to provide for redundancy in case one of the trunks fails.

In this particular example, the trunks out of the Tandem office 15 are taken over multiple T1s 40 (for redundancy in case one of the T1s fail) into Voice over Internet Protocol (VoIP) Gateways 45. A T1 is a circuit switch technology circuit that has industry standard signaling.

Note that other types of communication circuits may be utilized in other embodiments. Furthermore, redundant use of communication connections as described herein is desirable but is not a necessary feature of the present invention. The call comes out of the Tandem switch 15 on a specific T1 circuit 40. Each T1 has 24 voice channels and each of those 24 voice channels is dedicated to a specific call center. So, for example, two T1s will have a total of 48 circuits that can be dedicated to 48 call centers. The circuits could serve, for example, 12 call centers with 4 trunks each, for a total of 48 channels, each of which is dedicated to a specific call center. In other words, each trunk or channel is dedicated to a specific call center. The concept is to split those trunks to a specific call center to where half the circuits are on one T1 and the other half are on another T1; or, on a larger system, there will be more than two T1s (but there is always minimum of two T1s for redundancy). So the trunks are split; no more than half of the trunks going to a particular call center will be on one T1, and when a call comes in, the switch knows which call center the call is for.

The VoIP Gateway 45 then converts the T1 circuit switch technology signaling into VoIP signaling. The VoIP Gateway 45 also picks up the ANI and may deliver it to a primary server 60 to make it available for other uses. The VoIP signal then goes through a local area network (LAN) hub or switch 50. That call may then be routed from the LAN hub 50 through a soft switch or gatekeeper or call manager 55, and the call manager 55 then directs that call to a particular call center 30. The central data manager 32 of FIG. 2 also includes a router 98. This router 98 takes the VoIP signal and puts it onto a wide area communication network (WAN) or intranet 25 to make the connection to the appropriate call center 30. There are multiple call centers 30 that are connected to this same network 25.

Figure 3:
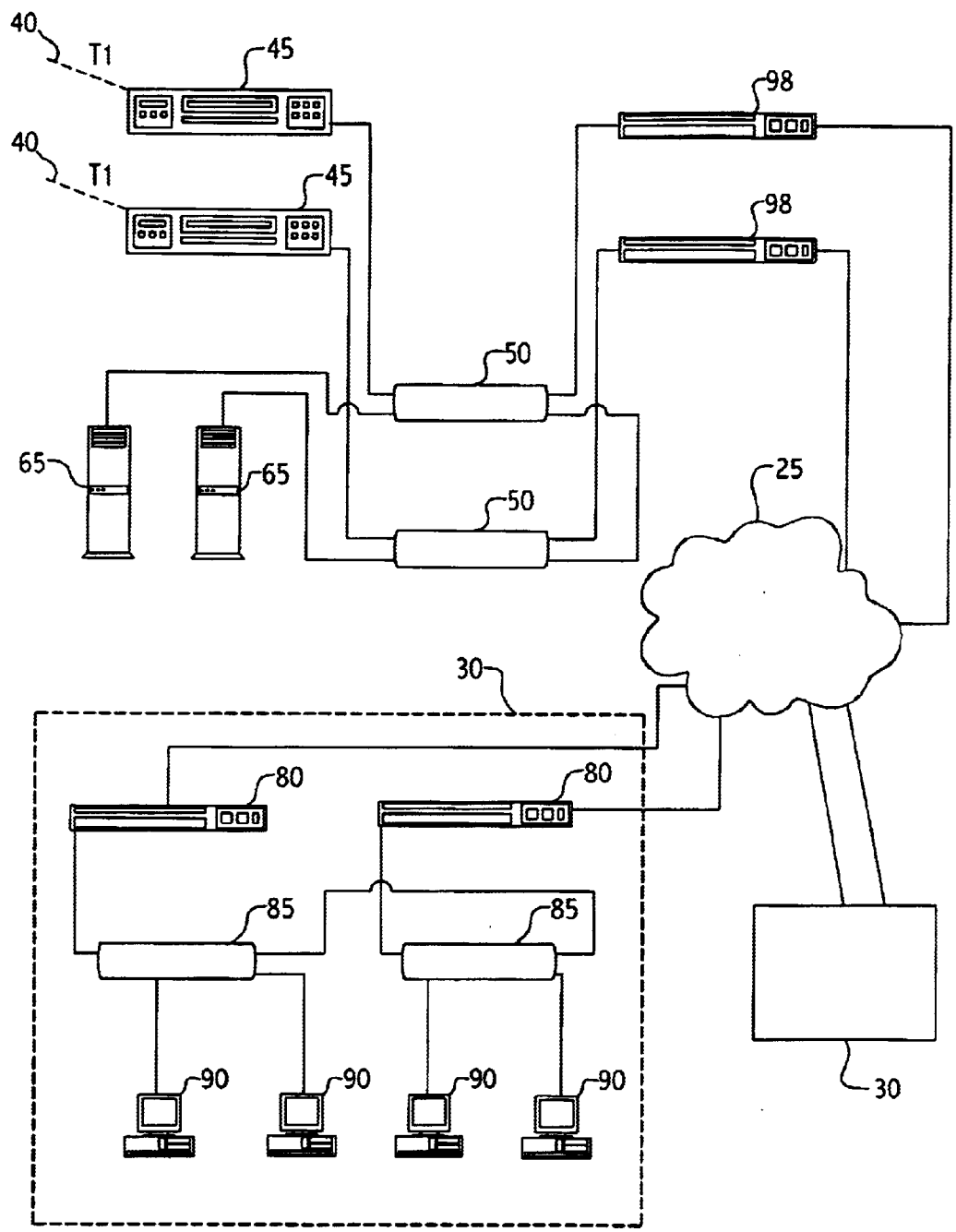
FIG. 3 depicts a redundant system in accordance with an embodiment of the present invention.

When the call is presented to a particular call center 30 through a router 80 at the call center 30, the call will ring on a virtual phone or physical VoIP telephone set 90. FIG. 2 depicts two Virtual Phones 90, Position 1 and Position 2. Of course, the invention is not limited to two positions; there will be as many positions as are necessary for the particular call center to handle the traffic, and the number of positions in this concept will not vary from traditional call centers. Both ANI/ALI information (i.e., data) and voice are preferably being delivered over the WAN or intranet 25 via the IP protocol on the same feed. In the embodiment shown by FIG. 2, instead of having separate circuits for voice and data, redundant feeds, each of which carry both voice and data (e.g., ANI/ALI) may be used. This redundancy is depicted in FIG. 3.

The call will then proceed through the router 80 in the call center 30 into a LAN hub or switch 85 that is capable of handling voice. When the call rings there, the associated data is also reported back to the central data manager 32 through an IP link into a primary server 60 with local database and/or a secondary, or backup, server 65 with local database. All of this information is delivered over the same WAN or intranet 25 via the call center router 80 to the secure facility router 90 back to the LAN hub 50 in the secure facility into primary server 60 and backup server 65. The data is reported through either a serial link or an IP packet. The data informs the server(s) 60, 65 that the call on this trunk was presented to this call center 30 and that it has been answered. The software that is running on these servers 60, 65 will then deliver the call screen, which includes the ALI (automatic location information) including the name and the address and other pertinent information about that calling party, to the call taker at the call center 30. Out of the call center 30, the local Central Office with dial tone 35 is a line going to the local DT switch 95 and providing dial tone. This represents administrative lines that allow local phone calls to be made without having to go through a wide area network that could possibly be long distance. In other words, a person could simply press a button on a virtual phone 90 that would get a dial tone through the local DT switch 95.

The servers (both primary 60 and backup 65) have the capability to serve multiple call centers 30 on one or various partitions. Thus, this allows the amount of equipment required by each call center 30 to be reduced, thereby reducing total equipment costs. Instead of having an ANI/ALI controller and a primary and backup server at each call center, multiple call centers 30 (i.e., hundreds) in a plurality of locations may be served by a single central data manager 32 at a central site. Multiple servers are preferably used for redundancy and reliability. Redundant circuits to each call center are still recommended, i.e., two or more high speed (e.g., 56K or higher) circuits. The redundant circuit may be a wireless facility or it could be any means for delivering IP, e.g., a connection over a virtual private network or over the internet or a dial-up link. There are various methodologies for transmitting voice and data to a call center over IP. The redundancy, that is, having at least two circuits to the call center, eliminates individual trunk circuits as well as multiple ALI database circuits to a centralized remote database from each call center. In this case, the redundant circuits will serve as many trunks as desired and the only thing that would change is the bandwidth of the pipes that deliver the IP trunking to the call center.

The equipment for a central data manager 32 may exist at multiple facilities for the sake of redundancy, e.g., the Voice over IP Gateway 45 may be physically located in two different facilities miles apart. Likewise, the primary server 60 and backup server 65 might be in two separate facilities miles apart. So if one of the servers were to be out of service for some reason, the other one could pick up the load and continue on. The server controller, which can be implemented in software, hardware, or a combination thereof, is modular such that different modules may be run on different servers. Furthermore, the workload can be distributed. As the workload increases for a particular controller module, that module can be removed and run on another server that has, for example, more horsepower.

Particular to this invention is the grouping of and interconnectivity between the equipment in the system. The central data manager 32 that houses the primary 60 and backup 65 servers may also house a computer-aided dispatch (CAD) server 70 and a mapping server 75. CAD and mapping are used, for example, when someone dials 911. In order that the caller can be located within a certain amount of accuracy, CAD/mapping draws a map and pinpoints a location on the map. It may also show the nearest police car to that incident or the nearest ambulance or fire station. Computer-aided dispatch allows the 911 service to dispatch that particular fire department or police car or ambulance to the scene. CAD/mapping can show a particular rescue unit's availability and status, and, for example, when a police car is dispatched to the incident, the police car can be dragged and dropped on the screen onto the incident. Often the emergency service has a need to talk to everyone at the incident, but frequently the fire truck, the police car, and the ambulance are all on different radio frequencies. In this situation, CAD/mapping gives the emergency service a way to click on the incident and, through interfaces, it maintains multiple frequencies on the radio and allows the emergency service personnel to send a simultaneous transmission, rather than having to go through the radio consoles, select all the necessary channels, and then send the message. In other words, the computer interfaces with the radio equipment and allows a single transmission. The CAD/mapping server(s) 70, 75 will be connected so that CAD/mapping services may be provided to any of the call centers 30 over the same connection. Such "common equipment," such as CAD servers, mapping servers, etc., do not need to be purchased and installed for every single call center that is part of the system. Although some call centers may want their own CAD/mapping servers, the multiplicity could easily be eliminated and the system could share a common server for these CAD/mapping services. With this system 10 design, servers 60, 65 in centralized points serve multiple call centers 30 rather than each call center having every piece of equipment at its premise.

Also, rather than necessarily having a server 60 on premise at each call center 30, each call center's information may be placed on a single server 60 in the central controlled environment 20 and simply deliver what a call center 30 needs. For example, when a person logs on to the server 60 for administrative purposes, he will be able to look at the call logs associated with his particular call center 30 without having to look at the call logs for the several other call centers that are sharing the same server 60. Each call center 30 has its own unique call center identification, unique set of speed dials, unique set of agency associations, and other unique information. Each call center 30 or subscriber may have its own database on the central server 60. For instance, in any given area, information about or directions to get to a particular address, instead of simply the address, may be helpful. Every call center 30 preferably has the ability to add, modify, and delete its own information. Previously, databases were not set up to have multiple call centers with each call center accessible by only its own employees. Multiple centers would have had to share a single database which may not be feasible for privacy reasons or inter-agency problems or for whatever reason. But the server 60 of the embodiment shown by FIG. 2 allows for privacy of information via database partitioning. The partitioned database structure allows multiple independent call centers 30 to be served from a single server 60. This includes user interfaces for entering data for each call center 30, such as supporting agencies, speed dial lists, individual telephone trunk/line interfaces, individual on-premise phone systems as well as reporting software for reporting data to the call center 30.

Normal security and redundancy designs are applicable to this server 60 design. Nothing in the present invention prevents the customary uses of firewalls. Furthermore, if the voice gateways 45 go into two different LAN switches and hubs 50 and those two hubs 50 are tied together with a link, each one also has a connection to either the primary 60 or backup server 65 so that if one hub or switch 50 is lost, the other one is capable of taking the load. In addition, at least two Wide Area Network (WAN) routers 98, 80 may be used on each side for redundancy.

The primary 60 and backup 65 servers have the ability to have local as well as remote databases. For example, a local database can take updates from the telephone company as service orders are processed. If a person moves into a residence and signs up for phone service, if he is a new subscriber in the area, a new record is generated (often called an "insert" record) which contains the subscriber's name, address, telephone number, and Emergency Service Number (ESN), which is something related to 911 that says this address is served by a particular PSAP call center, fire department, police department, EMS service, etc., so if the subscriber dials 911, all of this information is presented. Then this or any other new, modified, or deleted information would be passed on to the primary server 60 typically once a day via a download. The central data manager 32 has the ability to store this database locally on site as well as remotely. This provides for flexibility, for example, for the smaller call centers that do not want to spend money on redundant circuits. Instead, the so-called small site would have the information locally and the redundancy would be in that a single link to off-site server(s) 100 would be used if the primary server 60 local database was out of service. In addition, with the redundant server system of the present invention, the changes from the primary server 60 would be updated to the remote servers 100 as well as to the backup server 65. The result is one shared central data manager 32 that may serve various databases for multiple call centers 30.

The present invention is not limited to public safety answering point call centers. The method and system of the present invention can be used for any organization or service, for example, for dispatching a truck for package and mail pickup or delivery services, taxi or limousine services, food delivery services, plumbing services, floral delivery, etc. It is ideal for, but not limited to, any type of fleet management system, pickup/delivery services, or time-critical service provided at a residential or commercial location. The present invention can be used for receiving and collecting information from a call and then routing the call to the nearest branch office, central office, etc. Any kind of services-oriented business can benefit from the system of the present invention in order to take calls as well as to share a phone system, instead of having a key system and/or private branch exchange (PBX) for each different site. Sharing a common Voice over IP system is a major advantage of the present invention, but in addition, these other products, such as mapping, ALI, and computer-aided dispatch, are beneficial in industries other than public safety and emergency 911 services.

Rather than having to dispatch maintenance people to do upgrades, the server 60 may be maintained with the latest software upgrades at the server level. In addition, training on the usage of the server 60 is offered out of a centralized place, in addition to web-based training over the closed circuit. The server 60 also has the capability to support multiple remote printers, CAD interfaces, remote databases, and telephone systems from a central site 20.

Figure 4:
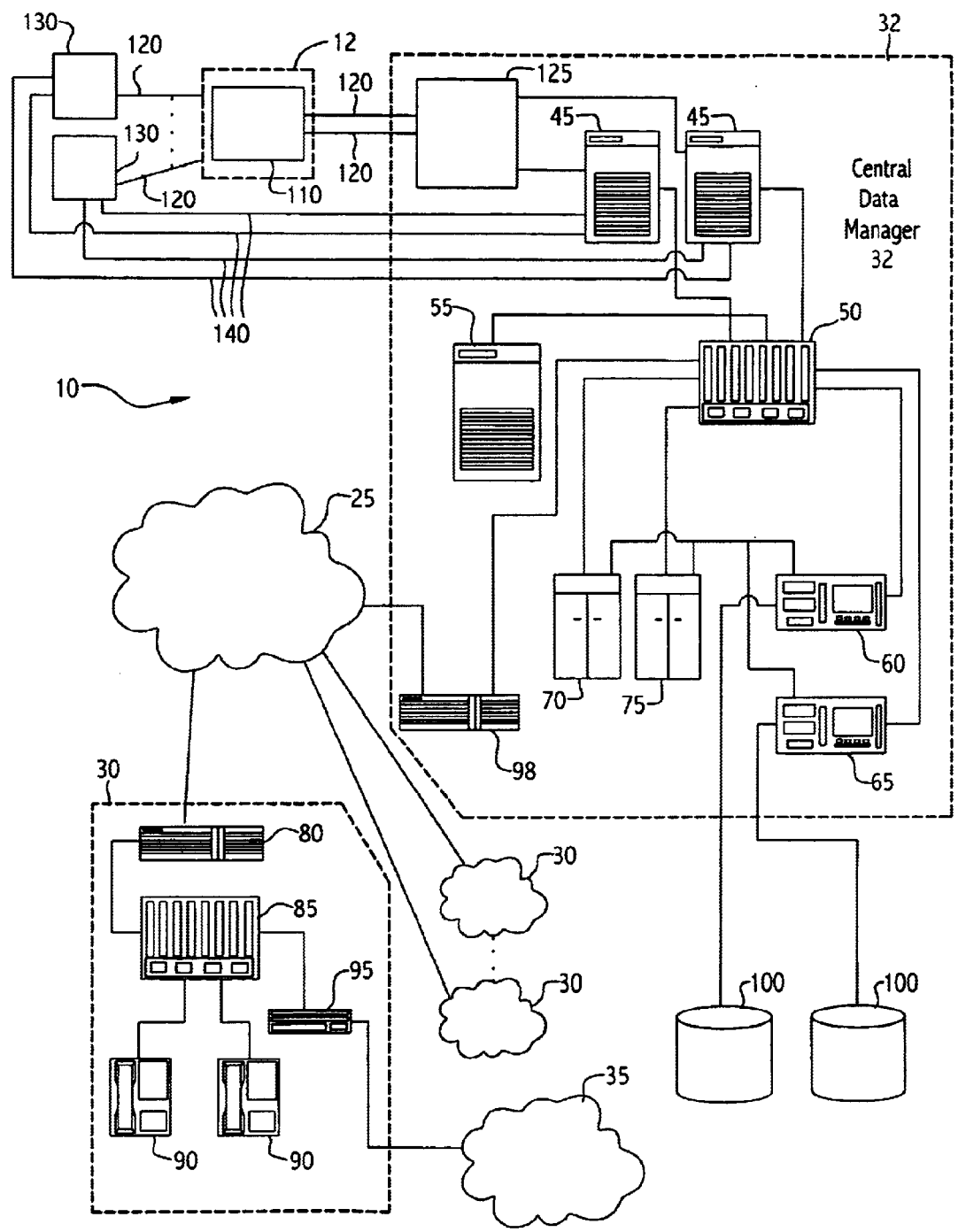
FIG. 4 depicts an alternate embodiment of the system depicted in FIG. 1.

Having the tandem office 15 is not a necessary feature of the system 10 of this invention. In an alternate embodiment as depicted in FIG. 4, the Tandem office 15 is eliminated and replaced, for example, with an SS7 network 110. In this embodiment, the primary 60 and/or backup 65 servers provide the database lookups and call routing to the appropriate call center 30 based on the ANI/ALI of the calling number. In this embodiment, all of the calls are routed from the SS7 network 110 to the central data manager 32. Connections to the VoIP gateways 45 still exist, but instead of using T1 links 40, the alternate embodiment may use SS7 signaling links 120 to connect the existing SS7 network 110 to the VoIP gateways 45 via an SS7 signaling interface 125. SS7 signaling links 120 are also used to connect the end offices 130 to the SS7 network 110. The end offices 130 have separate voice circuits 140 to the VoIP gateways 45. The Public Switch Telephone Network (PSTN) 12 has multiple types of trunks. SS7 is a type of connection that sends signaling separate from the voice type of signaling 140; for example, it sends the automatic number identification (ANI) and other information over the signaling link channel 120 separate from the voice signal 140. The SS7 network 110 has a connection into every end office 130 that serves a particular geographical area, whether through local dial tone connection, wireless connection, internet service provider, etc. The SS7 signaling links 120 are simply a way to get the calls from each of these end offices 130 on the SS7 network 110 to the servers 60, 65. In addition, the SS7 signaling links 120 provide the ANI and other information to the server 60 so that the server 60 can then process the call to the appropriate call center 30. By using the SS7 network 110 and signaling links 120 (via the SS7 signaling interface 125, VoIP gateways 45, and LAN hub 50), the speed of the call is increased because channel associated signaling with multiple frequencies, which is slower and older technology, is not used. The SS7-delivered information is taken directly and converted to IP. Eliminating channel associated signaling as well as the Tandem is much faster. As soon as the call is received by the server 60, it is immediately dispatched to a phone which rings at the call center 30; an approximate five-to-six second delay is eliminated.

What is claimed is:

1. An emergency services communication system, comprising:

a plurality of remote terminals for enabling emergency services operators to receive incoming calls and to dispatch emergency service personnel in response to said incoming calls;

a wide area network interfaced with each of the plurality of remote terminals;

a central data manager configured to receive said incoming calls and to route said incoming calls to said plurality of remote terminals over said wide area network;

wherein each of said incoming calls is associated with Automated Number Information and Automatic Location Information data identifying a communication device from which said incoming call originated and wherein each of said incoming calls is delivered over said Wide Area Network to a particular one of said remote terminals by said central data manager based on said associated Automatic Number Information of said incoming call and wherein said central data manager is located in a centralized secure facility with on-site server capability for analyzing and recording said Automatic Number information and said Automatic Location Information for each of said incoming calls; and wherein said centralized secure facility serves a plurality of Public Safety Answering Points, each of which comprise multiple individual members of said plurality of remote terminals.

2. An emergency services communication method, comprising the steps of:

providing a plurality of remote terminals;

providing a central data manager;

receiving, at said central data manager, incoming calls, wherein each of said incoming calls is associated with an Automatic Number Information and Automatic Location Information data packet identifying a communication device from which said incoming call originated;

selecting one of the remote terminals based on the Automatic Number Information and Automatic Location Information data associated with said incoming call;

routing said incoming call from the central data manager to the selected remote terminal over a wide are network thereby enabling an emergency service operator at the selected remote terminal to dispatch emergency service personnel in response to the one incoming call wherein said central data manager is located in a centralized secure facility with on-site server capability for analyzing and recording said data for each of said incoming calls; and wherein said centralized secure facility serves a plurality of Public Safety Answering Points, each of which comprise multiple individual members of said plurality of remote terminals.

3. A method for handling incoming emergency services calls having both voice and data signals associated with said calls, the method comprising the steps of:

presenting an incoming emergency call from a remote caller to a central data manager;

accessing data associated with said incoming call;

selecting a call center for said incoming call depending on said data associated with said incoming call delivered by digital circuits via voice over IP to said call center; and routing the incoming call from said central data manager to said selected call center thereby enabling an emergency service operator at said selected call center to dispatch emergency service personnel in response to said incoming call;

wherein said central data manager is located in a centralized secure facility with on-site server capability for analyzing and recording said data for each of said incoming calls; and wherein said centralized secure facility serves a plurality of Public Safety Answering Points, each of which comprise multiple individual members of said plurality of remote terminals.

4. The method of claim 3 wherein data associated with said incoming call includes both Automatic Number Information and Automatic Location Information data and is transmitted along with said voice signals over an IP network to said selected call center.

5. The method of claim 3 wherein the incoming call is routed to the selected Public Safety Answering Point using voice over IP over a wide area network.

* * * * *

UNITED STATES PATENT AND TRADEMARK OFFICE
Certificate

Patent No. 6,744,858 B1                                                                              Patented: June 1, 2004

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Terry S. Ryan, Grant, AL (US).

Signed and Sealed this Twenty-fifth Day of November 2014.

*CURTIS KUNTZ*
*Supervisory Patent Examiner*
Art Unit 2656
Technology Center 2600

UNITED STATES PATENT AND TRADEMARK OFFICE
CERTIFICATE OF CORRECTION

| | | |
|---|---|---|
| PATENT NO. | : 6,744,858 B1 | Page 1 of 1 |
| APPLICATION NO. | : 10/056411 | |
| DATED | : June 1, 2004 | |
| INVENTOR(S) | : Ryan et al. | |

It is certified that error appears in the above-identified patent and that said Letters Patent is hereby corrected as shown below:

Title Page, Item (75) should read as follows:

-- (75) Inventors: Terry S. Ryan, Grant, AL (US);
Randel W. Henry, Huntsville, AL (US);
William R. Whitehurst, Athens, AL (US) --.

Signed and Sealed this
Sixth Day of January, 2015

Michelle K. Lee
*Deputy Director of the United States Patent and Trademark Office*

(12) EX PARTE REEXAMINATION CERTIFICATE (6548th)
United States Patent
Ryan et al.

(10) Number: US 6,744,858 C1
(45) Certificate Issued: Dec. 2, 2008

(54) SYSTEM AND METHOD FOR SUPPORTING MULTIPLE CALL CENTERS

(75) Inventors: Terry S. Ryan, Grant, AL (US); Randel W. Henry, Huntsville, AL (US)

(73) Assignee: Tel Control, Inc., Huntsville, AL (US)

Reexamination Request:
No. 90/008,079, May 21, 2006

Reexamination Certificate for:
Patent No.: 6,744,858
Issued: Jun. 1, 2004
Appl. No.: 10/056,411
Filed: Jan. 25, 2002

Related U.S. Application Data

(60) Provisional application No. 60/264,242, filed on Jan. 26, 2001.

(51) Int. Cl.
*H04M 11/04* (2006.01)

(52) U.S. Cl. .................. 379/45; 379/49; 379/265.09
(58) Field of Classification Search .............. 379/45, 379/49, 265.09
See application file for complete search history.

(56) References Cited

U.S. PATENT DOCUMENTS

| | | |
|---|---|---|
| 5,479,482 A | 12/1995 | Grimes |
| 5,940,497 A | 8/1999 | Miloslavsky |
| 5,999,965 A | 12/1999 | Kelly |
| 6,009,163 A | 12/1999 | Nabkel et al. |

OTHER PUBLICATIONS

E9-1-1 Systems—Product Guide, *CML Public Safety Systems*, Jul. 1999.

*Primary Examiner*—Albert W. Paladini

(57) ABSTRACT

A system and method for routing calls from multiple call centers using remote terminals for receiving incoming calls, a wide area network interfaced with the remote terminals, and a central data manager configured to receive the incoming calls from a communication network and to route them to the remote terminals over the wide area network. The remote terminals enable operators to receive incoming calls and to dispatch personnel in response to the incoming calls. Each of the incoming calls is associated with an automatic number identification identifying a communication device from which the incoming call originated. Additionally, each of the incoming calls is routed over the wide area network to a particular remote terminal based on the associated automatic number identification of the incoming call.

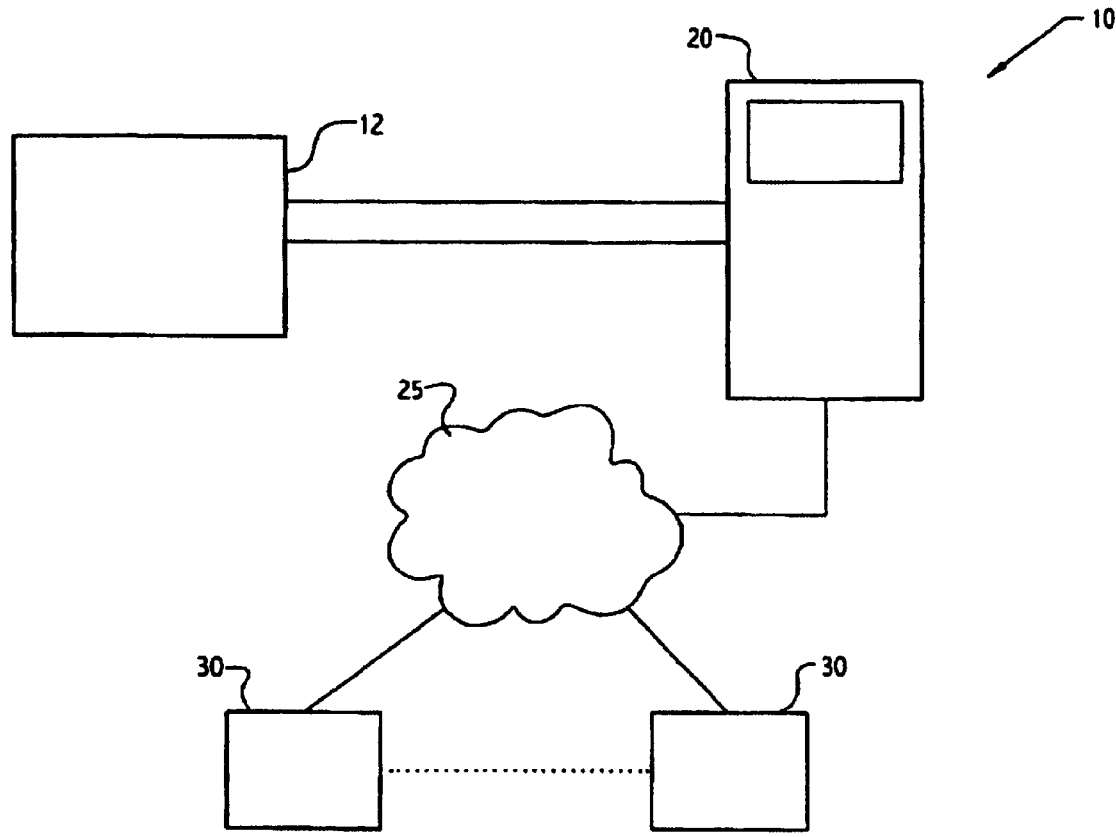

US 6,744,858 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2 and 3 are determined to be patentable as amended.

Claims 4 and 5, dependent on an amended claim, are determined to be patentable.

New claims 6–13 and 14 are added and determined to be patentable.

1. An emergency services communication system, comprising:
   a plurality of remote terminals for enabling emergency services operators to receive incoming calls and to dispatch emergency service personnel in response to said incoming calls *said terminals each associated with one of a plurality of call centers*;
   a wide area network interfaced with each of the plurality of remote terminals;
   a central data manager configured to receive said incoming calls and to route said incoming calls to said plurality of remote terminals over said wide area network, *said central data manager comprising a server having a database that is partitioned such that a first partitioned portion contains first data associated with a particular one of said call centers, so as to maintain privacy of the first data, the partitioned database being configured to serve the plurality of call centers*;
   wherein each of said incoming calls is associated with Automated Number Information and Automatic Location Information data identifying a communication device from which said incoming call originated and wherein each of said incoming calls is delivered over said Wide Area Network to a particular one of said remote terminals by said central data manager based on said associated Automatic Number Information of said incoming call and wherein said central data manager is located in a centralized secure facility with on-site server capability for analyzing and recording said Automatic Number information and said Automatic Location Information for each of said incoming calls; and wherein said centralized secure facility serves a plurality of Public Safety Answering Points, each of which comprise multiple individual members of said plurality of remote terminals.

2. An emergency services communication method, comprising the steps of:
   providing a plurality of remote terminals *wherein each of the remote terminals is associated with one of a plurality of call centers*;
   providing a central data manager *which includes a server having a database that is partitioned such that a first partitioned portion contains first data associated with a particular one of said call centers, so as to maintain privacy of the first data, the partitioned database being configured to serve the plurality of call centers*;
   receiving, at said central data manager, incoming calls, wherein each of said incoming calls is associated with an Automatic Number Information and Automatic Location Information data packet identifying a communication device from which said incoming call originated;
   selecting one of the remote terminals based on the Automatic Number Information and Automatic Location Information data associated with said incoming call;
   routing said incoming call from the central data manager [to] *by* the selected remote terminal over a wide [are] *area* network thereby enabling an emergency service operator at the selected remote terminal to dispatch emergency service personnel in response to the one incoming call
   wherein said central data manager is located in a centralized secure facility with on-site server capability for analyzing and recording said data for each of said incoming calls; and
   wherein said centralized secure facility serves a plurality of Public Safety Answering Points, each of which comprise multiple individual members of said plurality of remote terminals.

3. A method for handling incoming emergency services calls having both voice and data signals associated with said calls, the method comprising the steps of:
   presenting an incoming emergency call from a remote caller to a central data manager *which includes a server having a database that is partitioned such that a first partitioned portion contains first data associated with a particular one of a plurality of call centers, so as to maintain privacy of the first data, the partitioned database being configured to serve the plurality of call centers*;
   accessing data associated with said incoming call;
   selecting a call center *from said plurality of call centers* for said incoming call depending on said data associated with said incoming call delivered by digital circuits via voice over IP to said call center;
   *accessing data from a partitioned portion of the database that contains data associated with the related call center;* and
   routing the incoming call from said central data manager to said selected call center *along with information corresponding to the data accessed from the partitioned portion of the database*, thereby enabling an emergency service operator at said selected call center to dispatch emergency service personnel in response to said incoming call;
   wherein said central data manager is located in a centralized secure facility with on-site server capability for analyzing and recording said data for each of said incoming calls; and
   wherein said centralized secure facility serves a plurality of Public Safety Answering Points, each of which comprise multiple individual members of said plurality of remote terminals.

*6. The emergency services communication system of claim 1 wherein the database is local to the server.*

*7. The emergency services communication system of claim 1 wherein the database is remote to the server.*

8. The emergency services communication system of claim 1 wherein the database comprises a plurality of databases that are both local and remote to the server.

9. The emergency services communication method of claim 2 wherein the database is local to the server.

10. The emergency services communication method of claim 2 wherein the database is remote to the server.

11. The emergency services communication method of claim 2 wherein the database comprises a plurality of databases that are both local and remote to the server.

12. The emergency services communication method of claim 3 wherein the database is local to the server.

13. The emergency services communication method of claim 3 wherein the database is remote to the server.

14. The emergency services communication method of claim 3 wherein the database comprises a plurality of databases that are both local and remote to the server.

* * * * *

(12) EX PARTE REEXAMINATION CERTIFICATE (10099th)
United States Patent
Ryan et al.

(10) Number: US 6,744,858 C2
(45) Certificate Issued: Apr. 3, 2014

(54) SYSTEM AND METHOD FOR SUPPORTING MULTIPLE CALL CENTERS

(75) Inventors: Terry S. Ryan, Grant, AL (US); Randel W. Henry, Huntsville, AL (US)

(73) Assignee: Cassidian Communications, Inc., Temecula, CA (US)

Reexamination Request:
No. 90/012,897, Jun. 25, 2013

Reexamination Certificate for:
Patent No.: 6,744,858
Issued: Jun. 1, 2004
Appl. No.: 10/056,411
Filed: Jan. 25, 2002

Reexamination Certificate C1 6,744,858 issued Dec. 2, 2008

Related U.S. Application Data

(60) Provisional application No. 60/264,242, filed on Jan. 26, 2001.

(51) Int. Cl.
*H04M 3/50* (2006.01)
*H04Q 3/66* (2006.01)

(52) U.S. Cl.
USPC .......................... 379/45; 379/265.09; 379/49

(58) Field of Classification Search
None
See application file for complete search history.

(56) References Cited

To view the complete listing of prior art documents cited during the proceeding for Reexamination Control Number 90/012,897, please refer to the USPTO's public Patent Application Information Retrieval (PAIR) system under the Display References tab.

*Primary Examiner* — Mary Steelman

(57) ABSTRACT

A system and method for routing calls from multiple call centers using remote terminals for receiving incoming calls, a wide area network interfaced with the remote terminals, and a central data manager configured to receive the incoming calls from a communication network and to route them to the remote terminals over the wide area network. The remote terminals enable operators to receive incoming calls and to dispatch personnel in response to the incoming calls. Each of the incoming calls is associated with an automatic number identification identifying a communication device from which the incoming call originated. Additionally, each of the incoming calls is routed over the wide area network to a particular remote terminal based on the associated automatic number identification of the incoming call.

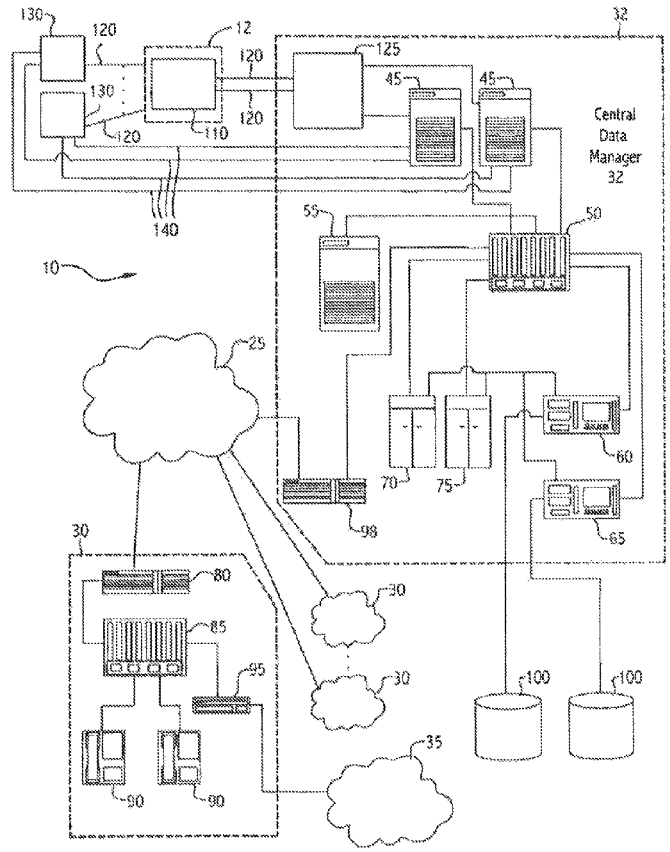

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-14 is confirmed.

\* \* \* \* \*